3,562,173
LASER MATERIALS

Mani L. Bhaumik, Pasadena, and Mustafa A. El-Sayed, Los Angeles, Calif., assignors, by mesne assignments, to Xerox Corporation, a corporation of New York
No Drawing. Filed Oct. 29, 1964, Ser. No. 407,543
Int. Cl. C09k 1/02; F21k 2/00
U.S. Cl. 252—301.2
11 Claims

ABSTRACT OF THE DISCLOSURE

A liquid laser material including a solution of a rare-earth chelate having a triplet state and a sensitizer compound, that is an aromatic aldehyde or ketone, having a triplet state above the chelate triplet state and adapted for fast, diffusion-controlled energy transfer from it to the rare-earth chelate.

---

The present invention relates to the laser art in general and more particularly relates to the discovery of new materials for high-power liquid lasers.

Truly versatile applications of lasers will be possible only after achieving high-power CW operation of them. However, primarily due to the problem of heat dissipation, the usual crystal and glass lasers stop operating at the higher power levels in the CW mode. Thus, heat dissipation has been a serious hindrance or obstacle to achieving CW operation at high power levels. It is widely accepted that a liquid laser capable of heat dissipation by recirculation of the liquid would solve this problem.

The feasibility of using chelates for liquid laser purposes has already been established; however, so far the operation has been limited to using highly viscous mediums at low temperatures and to achieve a truly liquid laser, the operation must be extended to the higher temperatures where the viscosity will permit recirculation. Fluorescence quenching has been a prime obstacle to this realization in that, in ordinary chelate laser material, the fluorescence efficiency decreases prohibitively with increases of temperature.

More specifically, although the rare-earth chelates satisfy the requirements for liquid laser materials, two basic difficulties have been encountered in their use due to their very high absorption coefficient. These are: (1) narrow effective pump bandwidth, and (2) the problem of recirculation due to narrow cavity diameter. Laser threshold considerations show that a minimum concentraiton of $10^{-3}$ moles per litre of the europium chelate is required to observe laser action. However, to achieve higher power, a concentration of $10^{-2}$ moles per litre should be and usually is used, but this is not too practicable because it requires that a cavity diameter of 0.05 mm. be utilized and for many reasons diameters below 1 mm. are undesirable. Even in a cavity of 2 mm. diameter, only a small part of the pump band near the tail end of the absorption curve is used, resulting in a higher threshold. A solution to this problem can be obtained by reducing the absorption coefficient of the chelates, since liquid lasers using chelates are most attractive from the point of view of heat dissipation by recirculation. Stated differently, the diameter of the laser cavity should be large enough to permit recirculation and a large enough diameter can be provided only if the absorption coefficient of the chelate is small enough to permit the pump light to penetrate to the center of the cavity.

It is, therefore, an object of the present invention to provide new materials with optimised characteristics for high power liquid lasers.

It is another object of the present invention to provide means by which the effective absorption coefficient of chelates is materially reduced.

It is a further object of the present invention to provide liquid laser materials that will permit the use of relatively large laser cavity diameters.

It is an additional object of the present invention to provide means for avoiding fluorescence quenching in the use of chelates in lasers.

The above-mentioned problems relating to the use of liquid laser materials are resolved to a very substantial degree by the new materials of the present invention. More particularly, in accordance with the concept of the subject invention, a sensitizer material having a low absorption coefficient is added to the chelate solution, a sensitizer being defined as a chemical material that is capable of absorbing the pump energy and thereafter transfers the energy to cause the laser ion to emit. Accordingly, the energy absorbed by the sensitizer is then transferred to the emitting laser ion by a process termed inter-intra molecular energy transfer and since the absorption coefficient of the sensitizer is low, both the requirements of large effective pump bandwidth and large cavity diameter are satisfied. More specifically, the sensitizer material is taken either from the family of aldehyde or the family of ketone materials and if the triplet state of the sensitizer, such as benzophenone, is situated over that of the chelate, such as europium hexafluoroacetylacetonate, a fast diffusion-controlled inter-molecular energy transfer takes place between the above two triplets, with the result that emission from the rare-earth ion will be observed if the emitting level of the ion is below the triplet level of the ligand. Hence, with the addition of a sensitizer material, the deleterious effects of the chelate's high absorption coefficient is avoided which, in turn, means that the opportunity now exists for using larger cavity diameters and to provide adequate heat transfer through the process of liquid circulation. It, therefore, also means that high-power CW operation of lasers is now feasible.

The novel features of the invention, together with further objects and advantages thereof, will be better understood from the following description in which are illustratively described new liquid laser materials encompassed by the invention.

Before describing the discovery that constitutes the present invention, it should be mentioned that intramolecular energy transfer from the ligand to the central metal ion in rare-earth chelates has been previously examined by several workers. (See, for example, S. I. Weissman, J. Chem. Phys. 10 214 (1942); A. N. Sevchenko and A. Trofimov, Zh. Eksperim, i. Teor. Fiz. 21, 220; A. N. Sevchenko and A. G. Morachevsky, Izvest. Akad. Nauk S.S.S.R. (Ser. Fiz.) 15, 628 (1951); and G. A. Crosby and M. Kasha, Spectrochim, Acta 10, (1958).) Furthermore, it has already been shown that by chemically changing the position of the molecular levels of the ligand relative to those of the rare-earth ion, the transfer takes place via the lowest "triplet" state of the ligand in the complex. (On this see, for example, G. A. Crosby et al., J. Chem. Phys. 34, 743 (1961); G. A. Crosby et al., J. Chem. Phys. 36, 863 (1962); and G. A Crosby et al., J. Mol. Spectry, 8, 315 (1962).) Finally, it has been shown that excitation could be transferred between the triplet state of a donor and that of an acceptor in organic systems (e.g. benzophenone to naphthalene). (See, for example, A. N. Teremin et al., Trans. Faraday Soc. 52, 1042 (1956).) The present invention is distinguished from this earlier art, however, by the fact that it involves or is concerned with the intramolecular sensitization of the central rare-earth ion in a chelate by the intermolecular triplet-triplet sensitization of the chelate triplet state by a donor in its triplet state. More specifically, if the triplet state of the sensitizer is situated over that of the chelate, a fast diffusion-controlled intermolecular energy transfer takes place between the two triplets and if the emitting level of the ion is below the triplet level of the ligand, emission from the rare-earth ion will then be observed.

In describing the invention in detail, it is deemed best for purposes of clarity to present the details of a particular experiment. However, it should be borne in mind that the invention is broader in scope than that of the conditions of the experiment and, therefore, that there is no intention here to limit its scope by this discussion but, rather, to provide insight into the invention by being specific.

Accordingly, the sensitizer used in the experiment was benzophenone which was excited in its $(n, \pi^*)$ state at ~3800 A. where the chelate $Eu(HFA)_3$ (europium tris hexafluoroacetylacetonate) has no absorption. The chelate, however, has a triplet level just below the triplet level of benzophenone. Concentrations of ~$10^{-3}$ M $Eu(HFA)_3$ and $10^{-1}$ M benzophenone in EPA (ether-isopentane-ethanol solvent) were used, where the ether, isopentane and ethanol were respectively mixed in a 5:5:2 proportion by volume. Chemical analysis on the sample used gave: C: 23.87%, Eu: 18.8%, H: 2.07%, and spectroscopic analysis showed the chelate to be reasonably pure. The luminescence studies were made in an Aminco spectrophosphorimeter modified for front surface excitation and viewing. The temperature dependence of the transfer was measured in a specially designed cold cell in which the geometry could be kept constant during changing temperature and samples. The temperature was changed by first cooling the cell with liquid nitrogen and then gradually heating with dry nitrogen. Excitation was achieved with a monochromator and a stabilized Hg arc.

The important observations that were made can be summarized as follows: (1) when excited at 3800 A. at room temperature, mixtures of benzophenone and the chelate showed an increase (by a factor of >10) in the intensity of the $Eu^{3+}$ characteristic red lines, (2) the activation curve of the $Eu^{3+}$ red lines of the chelate showed the 3800 A. absorption bank of benzophenone together with the 3140-A. absorption of the chelate, (3) when intramolecularly sensitized by the chelate absorption at 3140 A., the $Eu_3^+$ emission increased, then levelled off as the temperature decreased. This was due to the decrease in the quenching of the $Eu^{3+}$ emission as the temperature decreased, (4) when intermolecularly sensitized by the benzophenone absorption at 3800 A., the $Eu^{3+}$ intensity increased to a maximum (at ~−25° C.), then fell down, then leveled off as the temperature decreased, (5) the position of the maximum and the slope of the curve obtained in Result (4) were sensitive to oxygen and the concentration of the mixture, (6) mixtures of $10^{-1}$ M benzophenone with $10^{-3}$ M $EuCl_3$ in EPA did not show sensitized $Eu^{3+}$ emission when excited with 3800 A. light. This indicated that direct sensitization of the $Eu_3^+$ levels was not very efficient.

The maximum obtained in Result (4) might be understood if one realizes that at a certain concentration, the rate of the intermolecular energy transfer is directly proportional to the diffusion radius as well as the donor life time. While the former decreases as temperature decreases, the latter increases because the rate of quenching mainly by $O_2$, decreases. In support of this explanation is the sensitivity of the shape of the curve to $O_2$ (Result (5)).

These experiments strongly indicated sensitization of $Eu^{3+}$ emission in the chelate by benzophenone. The possibility of the transfer taking place by forming a stable complex between benzophenone and the chelate should not be completely excluded. However, there are indications to make this possibility highly improbable. First destroying the stable chelate structure by benzophenone attack was energetically unfavorable. Second, should such complexing be feasible, it would take place through the non-bonding electrons of the carbonyl group of benzophenone. This would cause a great blue shift of the $(n, \pi^*)$ level and therefore would cause a corresponding blue shift in the activation curve for $Eu^{3+}$ lines in the region of 3800 A. (contrary to observations). Third, if the transfer was due to a benzophenone-$Eu^{3+}$ complex Result (6) would have been positive.

Consequently, the following is proposed as the more likely explanation: (1) That there was an intermolecular diffusion-controlled energy transfer between the benzophenone triplet state and the "triplet state" of the complex, (2) Since $Eu^{3+}$ emission was observed, that an intramolecular energy transfer between the "triplet" state of the complex and the $Eu^{3+}$ levels was taking place, (3) The inter- as well as the intramolecular energy transfer in the system must have been taking place at a rate faster than $10^{-6}$ sec. (at ~$10^{-2}$ M). This limit is fixed by the minimum rate at which triplet states are quenched (by $O_2$) at room temperature.

It should be pointed out that emission resulting from triplet-triplet sensitization was previously observed only in rigid media. In the system reported here, the sensitized emission is observed in a fluid medium and thus at lower concentrations. This is due to the fact that the transfer is diffusion-controlled and, more important, the sensitized emission, being due to 4f electrons, is well protected against strong quenching.

It was previously mentioned that the invention was not limited to the above-described experiment and, therefore, of broader scope. Accordingly, by way of example, presented below is a table listing additional sensitizer, chelate and solvent materials that may be utilized in practicing the invention, the sensitizers listed being from the family of ketone materials that may be used.

| Chelate | Sensitizer | Solvent |
|---|---|---|
| 1. Europium hexafluoroacetylactonate, EuHFA | Benzophenone | Perdeuteroacetonitrile, dry. |
| 2. Europium thenoyltrifluoroacetonate, EuTTA | Acetophenone | Perdeuteromethanol. |
| 3. Europium trifluorobenzoylacetonate, EuTBA | 1,4 dibenzoylbenzene | Dimethylformamide. |

However, as previously mentioned, sensitizer may also be obtained from the aldehyde family of materials. Accordingly, a further table of sensitizer, chelate and solvent materials is listed below wherein the sensitizer is taken from the aldehyde family.

| Chelate | Sensitizer | Solvent |
|---|---|---|
| 1. Europium hexafluoroacetylacetonate, EuHFA | Benzaldehyde | Perdeuteroacetonitrile, dry. |
| 2. Europium thenoyltrifluoroacetonate, EuTTA | do | Perdeuteromethanol. |
| 3. Europium trifluorobenzoylacetonate, EuTBA | Benzaldehyde benzene | Dimethylformamide. |

Having thus described the invention, what is claimed is:

1. A liquid laser material consisting essentially of a solution of a rare-earth chelate in a solvent therefor, said rare-earth chelate having a triplet state and having the emitting level of the rare-earth ion below said triplet state; and an aromatic sensitizer compound selected from the group consisting of aromatic aldehydes and aromatic ketones, having a carbonyl group linked directly to at least one aromatic nucleus, said sensitizer compound having a lower absorption coefficient in said solution, a triplet state above said chelate triplet state, and being adapted for fast, diffusion-controlled energy transfer to said rare-earth chelate said sensitizer being present in an amount sufficient to promote lasing but insufficient to prevent pentration of the pump radiation to the center of the lasing medium.

2. A liquid laser material consisting essentially of a solution of a rare-earth chelate in a solvent therefor, said rare-earth chelate having a triplet state and having the emitting level of the rare-earth ion below said triplet state; and an aromatic sensitizer compound selected from the group consisting of aromatic aldehydes, having a carbonyl group linked directly to at least one aromatic nucleus, said sensitizer compound having a lower absorption coefficient in said solution, a triplet state above said chelate triplet state, and being adapted for fast, diffusion-controlled energy transfer to said rare-earth chelate said sensitizer being present in an amount sufficient to promote lasing but insufficient to prevent penetration of the pump radiation to the center of the lasing medium.

3. The liquid laser material of claim 2 wherein said aromatic aldehyde sensitizer compound is benzaldehyde.

4. A liquid laser material consisting essentially of a solution of a rare-earth chelate in a solvent therefor, said rare-earth chelate having a triplet state and having the emitting level of the rare-earth ion below said triplet state; and an aromatic sensitizer compound selected from the group consisting of aromatic ketones, having a carbonyl group linked directly to at least one aromatic nucleus, said sensitizer compound having a lower absorption coefficient in said solution, a triplet state above said chelate triplet state, and being adapted for fast, diffusion-controlled energy transfer to said rare-earth chelate said sensitizer being present in an amount sufficient to promote lasing but insufficient to prevent penetration of the pump radiation to the center of the lasing medium.

5. The liquid laser material of claim 4 wherein said aromatic ketone sensitizer compound is selected from the group consisting of benzophenone, acetophenone and 1,4 dibenzoyl benzene.

6. The liquid laser material of claim 4 wherein said aromatic ketone sensitizer compound is benzophenone.

7. The liquid laser material of claim 4 wherein said aromatic ketone sensitizer compound is acetophenone.

8. The liquid laser material of claim 4 wherein said aromatic ketone sensitizer compound is 1,4 dibenzoyl benzene.

9. The liquid laser material of claim 1 wherein said solvent is perdeutero acetonitrile.

10. The liquid laser material of claim 1 wherein said solvent is dimethyl formamide.

11. The liquid laser material of claim 1 wherein said rare-earth chelate is a chelate of europium.

References Cited

UNITED STATES PATENTS 3,377,292  4/1968  Halverson  252—301.3

OTHER REFERENCES

Kropp et al.—Enhancement of Fluorescence Yield of Rare Earth Ions by Heavy Water.

Journal of Chemical Physics vol. 39, No. 10 Nov. 15, 1963, pp. 2769–2770.

TOBIAS E. LEVOW, Primary Examiner

R. D. EDMONDS, Assistant Examiner

U.S. Cl. X.R.

331—94.5